United States Patent
Tews et al.

(10) Patent No.: US 9,446,554 B2
(45) Date of Patent: Sep. 20, 2016

(54) LABEL FILM FOR DEEP-DRAWING PROCESSES

(75) Inventors: Wilfrid Tews, Bechhofen (DE); Yvonne Duepre, Enkenbach-Alsenborn (DE)

(73) Assignee: Treofan Germany GmbH & Co., Neunkirchen (DE)

( * ) Notice: Subject to any disclaimer, the term of this patent is extended or adjusted under 35 U.S.C. 154(b) by 209 days.

(21) Appl. No.: 13/143,958

(22) PCT Filed: Jan. 13, 2010

(86) PCT No.: PCT/EP2010/000134
§ 371 (c)(1),
(2), (4) Date: Jul. 11, 2011

(87) PCT Pub. No.: WO2010/081682
PCT Pub. Date: Jul. 22, 2010

(65) Prior Publication Data
US 2011/0268934 A1    Nov. 3, 2011

(30) Foreign Application Priority Data

Jan. 15, 2009   (DE) .................. 10 2009 005 137

(51) Int. Cl.
| | |
|---|---|
| *B32B 3/10* | (2006.01) |
| *B29C 51/16* | (2006.01) |
| *B29C 51/10* | (2006.01) |
| *B32B 3/26* | (2006.01) |
| *B29C 55/02* | (2006.01) |
| *B29C 55/14* | (2006.01) |
| *B32B 27/32* | (2006.01) |
| *B32B 7/12* | (2006.01) |
| *B32B 27/08* | (2006.01) |
| *B32B 27/16* | (2006.01) |
| *B32B 27/18* | (2006.01) |
| *B29C 49/04* | (2006.01) |
| *B29C 49/24* | (2006.01) |
| *B29K 23/00* | (2006.01) |
| *B29L 31/00* | (2006.01) |

(52) U.S. Cl.
CPC ............ *B29C 55/023* (2013.01); *B29C 51/16* (2013.01); *B29C 55/143* (2013.01); *B32B 7/12* (2013.01); *B32B 27/08* (2013.01); *B32B 27/16* (2013.01); *B32B 27/18* (2013.01); *B32B 27/32* (2013.01); *B29C 49/04* (2013.01); *B29C 49/24* (2013.01); *B29C 51/10* (2013.01); *B29C 2049/2412* (2013.01); *B29C 2791/006* (2013.01); *B29C 2791/007* (2013.01); *B29K 2023/06* (2013.01); *B29K 2023/065* (2013.01); *B29K 2023/0625* (2013.01); *B29K 2023/0633* (2013.01); *B29K 2023/0641* (2013.01); *B29K 2023/083* (2013.01); *B29K 2023/12* (2013.01); *B29K 2423/065* (2013.01); *B29L 2031/744* (2013.01); *B32B 2264/0264* (2013.01); *B32B 2264/0278* (2013.01); *B32B 2264/102* (2013.01); *B32B 2264/104* (2013.01); *B32B 2307/21* (2013.01); *B32B 2307/31* (2013.01); *B32B 2307/406* (2013.01); *B32B 2307/41* (2013.01); *B32B 2307/414* (2013.01); *B32B 2307/518* (2013.01); *B32B 2307/72* (2013.01); *B32B 2307/746* (2013.01); *B32B 2307/75* (2013.01); *B32B 2439/00* (2013.01); *B32B 2519/00* (2013.01); *Y10T 428/24802* (2015.01); *Y10T 428/249983* (2015.04)

(58) Field of Classification Search
CPC ............................................. Y10T 428/24802
See application file for complete search history.

(56) References Cited

U.S. PATENT DOCUMENTS

| | | | |
|---|---|---|---|
| 6,764,760 B2 | 7/2004 | Nishizawa et al. | |
| 7,144,542 B2 | 12/2006 | Holzer et al. | |
| 7,744,992 B2 | 6/2010 | Schmitz et al. | |
| 2004/0028932 A1 | 2/2004 | Holzer et al. | |
| 2005/0260427 A1* | 11/2005 | Kochem et al. | ............. 428/523 |
| 2008/0044617 A1 | 2/2008 | Schmitz et al. | |
| 2009/0011183 A1* | 1/2009 | Kochem et al. | ............. 428/119 |
| 2010/0255287 A1 | 10/2010 | Schmitz et al. | |

FOREIGN PATENT DOCUMENTS

| | | |
|---|---|---|
| EP | 0889831 A1 | 1/1999 |
| WO | WO-9730903 A1 | 8/1997 |
| WO | WO-98/32598 A1 | 7/1998 |
| WO | WO-02/45956 A1 | 6/2002 |
| WO | WO-2006040057 A1 | 4/2006 |

* cited by examiner

*Primary Examiner* — Gerard Higgins
*Assistant Examiner* — Sathavaram I Reddy
(74) *Attorney, Agent, or Firm* — Drinker Biddle & Reath LLP

(57) ABSTRACT

The invention relates to the use of a multilayer, biaxially oriented polyolefin film comprising at least five layers as the label in deep drawing, which film is constructed from the following layers
I the base layer is free from vacuoles, and
IIa the outer intermediate layer is free from vacuoles and contains at least 95% by weight propylene polymer, which polymer has a propylene content of 98 to 100% by weight relative to the propylene polymer, and
IIIa printing may be applied to the outer cover layer, and
IIb the inner intermediate layer is constructed essentially from propylene polymer and contains vacuoles, and
IIIb the inner cover layer is applied to the surface of the inner intermediate layer and is a sealable cover layer, and is a sealable cover layer, and has a sealing initiation temperature <130° C.

21 Claims, No Drawings

LABEL FILM FOR DEEP-DRAWING PROCESSES

CROSS-REFERENCE TO RELATED APPLICATIONS

This application is a national stage application (under 35 U.S.C. §371) of PCT/EP2010/000134, filed Jan. 13, 2010, which claims benefit of German application 10 2009 005 137.6, filed Jan. 15, 2009.

BACKGROUND OF THE INVENTION

The invention relates to the use of a biaxially oriented polypropylene film as an in-mould label during deep drawing.

The term "label films" covers a broad, technically complex field. A distinction is made between various labelling techniques, which differ fundamentally in terms of the process conditions involved, and necessarily impose different technical requirements on the label materials. Yet the common purpose of all labelling processes is produce attractive labelling for receptacles, one element of which is the labels must have good adhesion to the labelled receptacle.

A very wide range of techniques for applying the label are used in the labelling processes. There are self-adhesive labels, wrap-around labels, shrink labels, in-mould labels, and patch labels to name a few. It is entirely possible to use a film made from thermoplastic as the label in all of these various labelling processes.

Various techniques, in which different process conditions are applied, are also used in in-mould labelling. A feature shared by all in-mould labelling processes is that the label is included in the actual method by which the container is given its shape and during which it is applied. Here too, however, very different forming methods are used, for example injection moulding, blow moulding, deep drawing.

In the injection moulding method, a label is placed in the injection mould and is back-injected with a liquefied plastic. The label bonds with the injection moulded part under the high temperatures and pressures used and becomes an integral, inseparable part of the injection moulded item. This process is used for producing cups and lids for ice cream or margarine tubs, for example.

In this process, individual labels are taken from a stack or cut to size from a roll for placing in the injection mould. The mould is shaped so that stream of molten plastic is directed behind the label and front of the film is facing the wall of the injection mould. During injection, the hot molten plastic bonds with the label. After injection, the tool opens, the injection moulded item with the label is ejected and cools down. The label must adhere to the container without creases or any visible imperfections.

During moulding, the injection pressure is in a range from 300 to 600 bar. The plastics used have a melt flow index of about 40 g/10 min. The injection temperatures depend on the plastic that is being used. In some cases, the mould is also cooled to prevent the injection moulded item from sticking to the mould.

In-mould labelling may also be used in blow moulding of containers or hollow bodies. In this process, a fusion tube is extruded vertically downwards through an annular die. A vertically divided moulding tool closes around the tube, which is thus squeezed shut at the bottom end. At the top end, a blow mandrel is inserted and the opening of the moulded part is formed through this. The warm fusion tube is supplied with air through the blow mandrel, such that it expands until it is lying flush against the interior walls of the moulding tool. In this case, the label must bond with the highly viscous plastic of the fusion tube. Then, the mould is opened and the excess material on the moulded opening is cut off. The moulded, labelled container is ejected and cools down.

In these blow moulding processes, the pressure for expanding the fusion tube is approximately 4-15 bar and the temperatures significantly lower than in injection moulding. The plastic materials have a lower MFI than in injection moulding, to ensure that the fusion tube is dimensionally stable and they therefore behave differently during the cooling process from the low-viscosity materials used for injection moulding.

In deep drawing, thick, unorientated plastic panels, usually cast PP or PS (polystyrene), having a thickness of approximately 200-750 μm are heated and drawn or pressed into an appropriate moulding tool using a vacuum or punching tools. Here too, the individual label is placed in the mould and bonds with the actual container during the moulding process. This process makes use of substantially lower temperatures, so that adhesion of the label to the container may be a critical factor. Good adhesion must also be guaranteed at these low processing temperatures. The processing speeds in this method are lower than in with injection moulding.

In principle, films made of thermoplastics may also be used for labelling the containers during moulding in deep drawing. For this purpose, the films must have a selected property profile to ensure that the label film and the deep-drawn moulded body fit against one another smoothly without bubbles during the deep drawing and bond to one another.

The adhesion of the label to the container is frequently flawed, because comparatively lower temperatures and pressures are used in deep drawing than in injection moulding or blowmoulding methods. Furthermore, similarly to blow-moulding, air inclusions arise between the label and the container, which impair the appearance of the labelled container and also the adhesion. Therefore, special adhesion layers or highly specialised film structures have previously been proposed as labels for deep drawing applications.

A film of this type is described, for example, in WO 02/45956. The cover layer of this film has improved adhesive properties in respect of a great variety of materials. The cover layer contains a copolymer or terpolymer made of an olefin and unsaturated carboxylic acids or their esters as the main component. It is described that this film may also be used as a label in deep drawing because of the improved adhesion.

WO 2006/040057 describes the use of a biaxially oriented film with a microporous layer as a label in a deep drawing process. The microporous layer contains a propylene polymer and at least one β-nucleating agent. The microporosity is created by converting β-crystalline polypropylene when the film is stretched. Air inclusions are avoided due to the porous structure of the film. The adhesion of the film is surprisingly good. Therefore, the porous film may be used advantageously in deep drawing.

WO 98/32598 describes an in-mould label that comprises at least two layers, a sealable cover layer and a base layer. The sealing layer is applied to the surface of the base layer and contains a polyolefin having a melting temperature lower than 110° C. It is stated that 25% or less of this polyolefin melts at a temperature below 50° C. It is not explicitly stated that the film may also be used in deep drawing processes. The cover layer may be selected from a very wide range of different polymers.

EP 0 889 831 describes an in-mould layer comprising at least two layers. A first layer is a hot seal layer, which is stated to be activatable at a temperature of 57 to 100° C. The second layer contains vacuoles and a non-spherical, vacuole-initiating particle. According to the specification, the thermal conductivity of the film is less than 1.25*10-4 kcal/sec cm*° C. Only blowmoulding is cited as an example of an in-mould process. Deep drawing applications are not made explicitly evident in the document. The document also does not explain what is meant by the initiation temperature.

U.S. Pat. No. 6,764,760 describes in-mould labels comprising multilayer films that include a base layer, an intermediate layer and a sealable cover layer. Blowmoulding, injection moulding and deep drawing are cited as examples of in-mould processes. The sealable layer should be embossed to avoid blistering. The sealable layer is constructed from polyethylene having a melting point from 50-130° C. Modified polymers such as EVA or acrylate-modified polymers may optionally be included in the sealable cover layer as well.

An enormous variety of films that may generally be used as in-mould labels is described in the related art. However, the disclosed teachings frequently make no distinction between the various moulding processes, and thus invite the inference that the in-mould labels are able to be used interchangeably and equally well in the various processes. In the context of the present invention, it was found that this is usually not the case. For example, there are films that function extremely well in injection moulding, but cannot be used in blowmoulding due to excessive blistering and poor adhesion. Films that work well in blowmoulding have too little adhesion for use in deep drawing processes. In principle, each moulding process requires a special film whose properties are optimised for the precise conditions of the respective application. The usability of a film in a given application does not allow any conclusions to be drawn regarding the suitability of the material for use in another application.

In general, conventional wisdom among those skilled in the art holds that blistering and adhesion become progressively more problematic from injection moulding to blowmoulding and finally deep drawing, since the conditions for moulding the container become "more moderate" in this order. Deep drawing is carried out at the lowest temperatures and under the lowest pressures, with the result that the standard in-mould labels in deep drawing applications do not satisfy the requirements regarding label adhesion and freedom from blistering. For this reason, up to the present time in-mould labelling is not routinely carried out in deep drawing processes. In practice, deep drawn receptacles are either printed directly or provided with a wrap-around label.

The few known solutions that satisfy the requirements in technical terms involve sophisticated film production steps, and are therefore simply too expensive to be used instead of direct printing or wrap-around labelling. The acrylate-modified polymers described in. WO 02/45956 are so adhesive and sticky that the film has an undesirable tendency to stick to the rollers during production, and is often rendered completely unusable by excessive caking on the winding drum. In addition, if it can be processed far enough to form a label stack, the film is difficult to remove from the stack. Attempts to reduce the adhesive strength with admixtures or additives to a point that enables the film to be handled and unstacked during production, processing and application impair the adhesion so much that the film is no longer suitable for use in the deep drawing application, since adhesion to the container is no longer satisfactory.

The porous film described in WO 2006/040057 can only be manufactured at extremely slow production speeds, because the β-crystallites are only created in sufficient quantities if the extruded molten mass cools slowly. The film according to U.S. Pat. No. 6,764,760 only works for the deep drawing application with the suggested embossing, an extra processing step that also renders the film more expensive.

The known solutions that have been developed specifically for deep drawing are thus all based on extreme adhesive strength of the film surface or extreme surface roughness or special surface structures. The outer surfaces of these rough have comparatively low gloss values. The need for a film that is able to be used for in-mould labelling in deep drawing processes while meeting the requirements regarding adhesion, unstacking properties, freedom from blistering, gloss and integration in the container, and which is able to be manufactured in accordance with the standard, inexpensive film manufacturing processes has so far gone unanswered.

Moreover, it is desirable to provide a label whose advantageous glossy appearance is preserved after labelling as well. It often happens that the outer surface of films has an attractively lustrous appearance before processing, but after processing the structure of the film has been altered to such an extent that this gloss has been significantly reduced, or disappeared entirely, or has been completely destroyed by the "orange peel" effect. It is therefore the object of the present invention to provide an in-mould label that retains its bright visual appearance even after it has been applied to the container, that is to say the glossiness that the outer surface of the film has originally should be largely intact after the labelling process has been completed.

A SUMMARY OF THE INVENTION

This object is solved by the use of a multilayer, biaxially oriented polyolefin film comprising at least five layers as the label in deep drawing, which film is constructed from a polypropylene base layer with one inner and one outer cover layer, and one inner and one outer intermediate layer, wherein I the base layer is free from vacuoles, and
IIa the outer intermediate layer is free from vacuoles and contains at least 95% by weight propylene polymer, which polymer has a propylene content of 98 to 100% by weight relative to the propylene polymer, and
IIIa printing may be applied to the outer cover layer, and
IIb the inner intermediate layer is constructed essentially from propylene polymer, and it contains vacuoles, and
IIIb the inner cover layer is applied to the surface of the inner intermediate layer and is a sealable cover layer, and has a sealing temperature<130° C.

A DETAILED DESCRIPTION OF THE INVENTION

The subordinate claims describe preferred embodiments of the invention.

Sealing initiation temperature II is understood to mean the sealing initiation temperature that is measured on the label film that is to be used as the inner cover layer. At this temperature, the inner cover layer is sealed against the inner cover layer.

For the purposes of the present invention, the inner cover layer is the cover layer that is facing towards the receptacle during labelling and forms bond between the deep drawn container and the label during labelling. For the purposes of the present invention, the outer cover layer is the cover layer that is facing away from the receptacle during labelling and forms the visible label surface. Correspondingly, the outer intermediate is applied between the outer cover layer and the base layer. The inner intermediate layer is applied between the inner cover layer and the base layer. The base layer forms the innermost, centre layer of the film.

Surprisingly, the film with the special structure as described in claim 1 satisfies all the requirements cited above for use as an in-mould label in the deep drawing process. The film exhibits excellent gloss on its outside surface, which is retained even after the labelling process. The film recedes visually as an integral part of the labelled container. Thus it is possible to provide a labelled container with a highly glossy appearance in the area of the label. Adhesion is excellent and no bubbles or other visible flaws occur, in the form of "orange peel" skin for example. The film is easy to work, not only while it is being manufactured, but also during processing, for example during printing and cutting to size, and during the labelling process, and in particular is able to be removed from the stack without difficulty.

In the context of the present invention, it was found that polypropylene films satisfy all of the requirements set forth above for use as in-mould labels in the deep drawing process if the sealable inner sealing layer IIIb is deposited on an intermediate layer that contains vacuoles. According to the known teaching, adhesion and absence of blistering in in-mould labels are essentially determined by the properties and surface structure of the inner cover layer. However, it was not previously known that the constitution of the adjacent layer may have a significant influence on adhesion and other label properties.

It is particularly surprising that film with an inner intermediate layer that contains vacuoles continue to demonstrate good adhesion when sealing initiation temperature II of the inner cover layer is not particularly low, although embodiments with a vacuole-containing inner intermediate layer and an inner cover layer having a low sealing temperature also lend themselves very well to the intended use. The film structure with an inner intermediate layer containing vacuoles thus allows of significantly greater flexibility in the selection of the inner cover layer, so that the in-mould label may be adapted more easily to the respective conditions when it is used as an in-mould label.

The inner cover layer contains at least one sealable co- or terpolymer I of propylene, ethylene and/or butylenes units, or mixtures of such co- and terpolymers I. Suitable co- or terpolymers I are constructed from ethylene, propylene or butylenes units, in which case terpolymers I contain three different monomers. The composition of co- or terpolymers I from the respective monomers may vary within the limits described in the following. In general, the co- and/or terpolymers contain more than 50% by weight propylene units, that is to say they are propylene co- and/or propylene terpolymers with ethylene units and/or butylenes units as comonomers. Copolymers I generally contain at least 60% by weight, preferably 65 to 97% by weight propylene and not more than 40% by weight, preferably 3 to 35% by weight ethylene or butylenes as comonomers. Terpolymers I generally contain 65 to 96% by weight, preferably 72 to 93% by weight propylene, and 3 to 34% by weight, preferably 5 to 26% by weight ethylene and 1 to 10% by weight, preferably 2 to 8% by weight butylene. The melt index of the co- and/or terpolymers is generally 0.1 to 20 g/10 min (190° C., 21.6N), preferably 0.1 to 15 g/10 min. The melting point may generally be in a range from 70 to 140° C. The layer thickness of the inner cover layer is generally 0.5-6 µm, preferably 1 to 3 µm.

The co- and terpolymers described in the preceding, as well as mixtures thereof, may also be characterized on the basis of their sealing initiation temperature I. This sealing initiation temperature I of the respective polymer or mixture is understood to be the sealing initiation temperature that is measured on a reference film having a polypropylene base layer and a cover layer I of about 1.5 µm, wherein this cover layer must consist solely of the co- or terpolymer or the mixture thereof and must not have undergone surface treatment. In this measurement, cover layer I is sealed against cover layer I. A second cover layer may optionally be applied on the opposite side, since this does not affect sealing initiation temperature I.

Surprisingly, sealing initiation temperature I of the co- and terpolymers may be varied within a wide range without negatively affecting the adhesion of the label. In general, this sealing initiation temperature I of the co- and terpolymers should lie within a range from 70-135° C., that is to say both low-sealing co- and terpolymers having a sealing initiation temperature I of 70 to 115° C., preferably 75-110° C. and standard co- and terpolymers I having a sealing initiation temperature I from >115 to 135° C., preferably 120-130° C. may be used.

The co- and terpolymers described in the preceding may be mixed with each other. In this case, the proportions of co- and terpolymers may be varied within any limits. Similarly in this case too, both low sealing mixtures having a sealing initiation temperature I from 70 to 115° C., preferably 75-110° C., and higher sealing mixtures having a sealing initiation temperature from >115 to 135° C., preferably 120-130° C., may be used.

In a preferred embodiment of the invention, the inner cover layer is composed essentially of low sealing co- and/or terpolymers having a sealing initiation temperature I from 70 to 115° C., preferably 75-110° C. For this, propylene-butylene copolymers having for example a butylenes content from 10 to 40% by weight, preferably 20 to 35% by weight, and a melting point in the range from 100-140° C. are preferred. In general, the inner cover layer contains 95-100% by weight, preferably 98 to <100% by weight co- and/or terpolymer I relative to the weight of the inner cover layer. For these embodiments, sealing initiation temperature II of the inner cover layer is 70-115° C. Surprisingly, these embodiments with low sealing inner cover layer have a relatively high roughness of the inner surface of the film, from 3 to 8 µm, preferably 4 to 7 µm with a cut-off of 0.25 mm, although the cover layer itself does not contribute to the roughness as is the case in cover layer mixtures of incompatible polymers. The thickness of the inner cover layer for this embodiment is preferably thin and generally contributes 0.5 to 3 µm.

Surprisingly, the roughness created indirectly by the inner, vacuole-containing intermediate layer is sufficient to ensure that the film is able to be processed and the label able to be removed from the stack even with a comparatively very low sealing initiation temperature II. It was expected that the cover layer would cause problems in processing due to sticking and caking, and that the labels would not be removable from the stack reliably because of the very low sealing initiation temperature II associated with the low sealing polymer. Surprisingly, however, these problems do not arise.

In a further advantageous embodiment of the invention, the inner cover layer is constructed from a mixture of the co- and/or terpolymer(s) with an incompatible polymer. In this case, the inner cover layer generally contains at least 30 to 95% by weight, preferably 45 to 80% by weight, and particularly 50 to 80% by weight of the co- and/or terpolymer(s) 1 and 5 to 70% by weight, preferably 20 to 55% by weight, particularly 20 to 55% by weight of an incompatible polymer, preferably a polyethylene, relative in each case to the weight of the inner cover layer.

Mixing the co- and/or terpolymers I with an incompatible polyethylene creates a surface roughness in known manner, which makes processing and stack removal easier. Surprisingly, this roughness of the inner surface of the film is increased further by the vacuole-containing intermediate layer. This increased roughness not only favours adhesion without blistering but also processability, particularly the stack removal properties, so that even particularly low sealing co- or terpolymers may be used in this mixture of incompatible polymers without encountering any problems in processing due to sticking, caking, or difficulties with removal from the stack.

For a low-sealing variant of this embodiment, low sealing co- and/or terpolymers I having a sealing initiation temperature I from 70 to 115° C., preferably 75-110° C., are mixed with polyethylene. Propylene-butylene copolymers mixed with MDPE or HDPE, for example, are preferred. The butylenes content of these copolymers is preferably 10 to 40% by weight, particularly 20 to 35% by weight, and their melting point is in a range from 100-140° C. The respective proportions of co- and/or terpolymers I and polyethylene in the inner cover layer are then selected from the ranges defined above in such manner that sealing initiation temperature II of the inner cover layer is not higher than 110° C., and is preferably in a range from 70-110° C., particularly 80-105° C. These embodiments generally have a surface roughness Rz of 6-10 µm, preferably 7-9 µm, with a cut-off of 0.25 mm. The thickness of the cover layer for these embodiments may vary within a wide range and is generally 0.5 to 6 µm, preferably 1 to 3 µm.

For a further variant of this embodiment with an inner cover layer of polymer mixtures, co- and/or terpolymers I having a sealing initiation temperature I of >115 to 135° C., preferably 120-130° C., are mixed with polyethylene. The respective proportions of the co- and/or terpolymers I and the polyethylene in the inner cover layer are then selected from ranges indicated such that sealing initiation temperature II of the inner cover layer is above 110° C., preferably in a range from 110-130° C. These embodiments have a surprisingly high surface roughness Rz from 7-12 µm, preferably 9 to 11 µm, with a cut-off of 0.25 mm. Surprisingly, this roughness of the inner surface of the film is further increased by the vacuole-containing intermediate layer, although the cover layer or incompatible polymers already has a certain roughness. This high roughness favours adhesion without blistering and processability, particularly the stack removal properties. Surprisingly, the adhesion of this embodiment is good even without low sealing co- or terpolymers. The thickness of the cover layer for these embodiments may also vary within a wide range and is generally 0.5 to 6 µm, preferably 1 to 3 µm.

The incompatible polymer of the mixture of the inner cover layer is preferably a polyethylene that is incompatible with the co- and/or terpolymers I described in the preceding. In this context, the term incompatible is understood to mean that the mixing the co- and/or terpolymers I with the polyethylene causes formation of surface roughness. Suitable polyethylenes are for example HDPE or MDPE. In general, HDPE has the properties described in the following, for example an MFI (50N/190° C.) greater than 0.1 to 50 g/10 min, preferably 0.6 to 20 g/10 min measured in accordance with DIN 53 735, and a viscosity number, measured in accordance with DIN 53 728, part 4 or ISO 1191, in the range from 100 to 450 cm$^3$/g, preferably 120 to 280 cm$^3$/g. Crystallinity is generally 35 to 80%, preferably 50 to 80%. The density, measured at 23° C. in accordance with DIN 53 479 method A or ISO 1183, is in the range from >0.94 to 0.96 g/cm$^3$. The melting point, measured by DSC (maximum of the melt curve, heating rate 20° C./min), is between 120 and 140° C. Suitable MDPE generally has an MFI (50N/190° C.) greater than 0.1 to 50 g/10 min, preferably 0.6 to 20 g/10 min, measured in accordance with DIN 53 735. The density, measured at 23° C. in accordance with DIN 53 479 method A or ISO 1183, is in the range from >0.925 to 0.94 g/cm$^3$. The melting point, measured by DSC (maximum of the melt curve, heating rate 20° C./min), is between 115 and 130° C.

Other arrangements, such as surface treatment, layer thickness and additives should be chosen with regard to sealing initiation temperature II for individual embodiments in such manner that the desired range for the respective sealing initiation temperature II is achieved. In general, surface treatments cause a slight rise in sealing initiation temperature II, particularly in the case of corona treatments. Sealing initiation temperature II may also be increased somewhat by reducing the thickness of the cover layer, provided the thickness remains within the usual range between 0.5-3 µm. Additives normally have a less marked effect on sealing initiation temperature II, but antiblocking agents for example may have an effect depending on the particle size.

The inner cover layer may contain small quantities of additional olefinic polymers if necessary, providing this does not impair its functionality as a deep drawn label, particularly adhesion, absence of blistering and ability to be removed from a stack. In this context, polymers that are incorporated in the inner cover layer via additive batches are conceivable.

The inner cover layer may also contain usual additives such as neutralising agents, stabilisers, antistatic agents, antiblocking agents and/or lubricants in effective quantities in each case. The following figures in percent by weight refer in each case to the weight of the inner cover layer.

Neutralising agents are preferably dihydrotalcite, calcium stearate and/or calcium carbonate having an average particle size not greater than 0.7 µm, an absolute particle size smaller than 10 µm and a specific surface area of at least 40 m2/g. In general, 0.02 to 0.1% by weight neutralising agent is added.

The compounds that are normally used to stabilise polyethylene polymers, propylene polymers and other olefinic polymers may be used as stabilising agents. These are added in a quantity between 0.05 and 2% by weight. Phenolic and phosphitic stabilisers such as tris-2,6-dimethylphenyl phosphate are particularly suitable. Phenolic stabilisers having a molar mass greater than 500 g/mol are preferred, particularly pentaerythrityl-tetrakis-3-(3,5-di-tert.butyl-4-hydroxyphenyl)propionate or 1,3,5-trimethyl-2,4,6-tris(3,5-di-tert.butyl-4-hydroxy-benzyl)benzene. In this context, phenolic stabilisers are used alone in a quantity of 0.1 to 0.6% by weight, particularly 0.1 to 0.3% by weight, and phenolic and phosphitic stabilisers are used in a ratio from 1:4 to 2:1 and in a total quantity of 0.1 to 0.4% by weight, particularly 0.1 to 0.25% by weight.

Preferred antistatic agents are glycerol monostearates, alkaline alkane sulphonates, polyether-modified, that is to say ethoxylated and/or propoxylated polydiorganosiloxanes (polydialkylsiloxanes, polyalkylphenyl siloxanes and similar) and/or the essentially unbranched, saturated aliphatic tertiary amines with an aliphatic radical having 10 to 20 carbon atoms substituted with alphahydroxy(C1-C4) alkyl groups, wherein N,N-bis-(2-hydroxyethyl)alkyl amines having 10 to 20 carbon atoms, preferably 12 to 18 carbon atoms in the alkyl radical are particularly suitable. The effective quantity of antistatic agent is in the range from 0.05 to 0.5% by weight.

Suitable antiblocking agents are inorganic additives such as silicon dioxide, calcium carbonate, magnesium silicate, aluminium silicate, calcium phosphate and similar and/or incompatible organic polymerisates such as polyamides, polyesters, polycarbonates and similar or crosslinked polymers such as crosslinked polymethyl methacrylate or crosslinked silicone oils. Silicon dioxide and calcium carbonate are preferred. The average particle size is between 1 and 6 μm, particularly between 2 and 5 μm. The effective quantity of antiblocking agent is in the range from 0.1 to 5% by weight, preferably 0.5 to 3% by weight, particularly 0.8 to 2% by weight.

Lubricants are higher aliphatic acid amides, higher aliphatic acid esters and metal soaps such as polydimethylsiloxanes. The effective quantity of lubricant is in the range from 0.01 to 3% by weight, preferably 0.02 to 1% by weight relative to the inner cover layer. The addition of 0.01 to 0.3% by weight of aliphatic acid amides such as erucic acid amide or 0.02 to 0.5% by weight polydimethylsiloxanes, particularly polydimethylsiloxanes having a viscosity of 5000 to 1,000,000 mm2/s is particularly suitable.

The inner cover layer described in the preceding is applied to the vacuole-containing inner intermediate layer IIb. The vacuole-containing inner intermediate layer of the film contains at least 70-98% by weight of propylene polymers, preferably 75 to 95% by weight, particularly 80 to 92% by weight, in each case relative to the weight of the intermediate layer, preferred polymers of such kind being propylene homopolymers and vacuole-initiating fillers. In general, the propylene polymer of the inner intermediate layer contains at least 96% by weight, preferably 98 to 100% by weight, propylene. If it is present, the corresponding comonomer content of not more than 4% or 0 to 2% by weight generally consists of ethylene. The values for percent by weight are relative to the propylene polymer in each case.

Isotactic propylene homopolymers having a melting point from 150 to 170° C., preferably from 155 to 165° C., and a melt flow index (measurement according to DIN 53 735 under 21.6N load and at 230° C.) from 1.0 to 10 g/10 min, preferably from 1.5 to 6.5 g/10 min. The n-heptane soluble fraction of the polymer is generally 0.5 to 10% by weight, preferably 2 to 5% by weight relative to the starter polymer. The molecular weight distribution of the propylene polymer may vary. The ratio of the weight average Mw to the number average Mn is generally between 1 and 15, preferably between 2 and 10. In a further embodiment, the isotactic polypropylene may be a highly isotactic polypropylene with a chain isotacticity (13C-NMR) greater than 95%, preferably 96-98%. Materials of such kind are known from the related art and are also called HCPP (high crystallinity polypropylene). In certain circumstances, an isotactic polypropylene may be selected that has been produced with the aid of a metallocene catalyst. These metallocene polypropylenes preferably feature a narrow molecular weight distribution (Mw/Mn<2).

The inner intermediate layer contains vacuole-initiating fillers in a quantity of 2-30% by weight, preferably 5 to 25% by weight, particularly 8 to 20% by weight relative to the weight of the intermediate layer. Besides the vacuole-initiating fillers, the intermediate layer may also contain pigments, preferably TiO2, for example in a quantity from 0 to 10% by weight, preferably 0.5 to 8% by weight, particularly 1 to 5% by weight. These percentages are relative to the weight of the intermediate layer.

For the purposes of the present invention, pigments are incompatible particles that do not contribute significantly to vacuole formation when the film is stretched. The colouring effect of the pigments is caused by the particles themselves. "Pigments" generally have an average particle diameter of 0.01 to a maximum of 1 μm, preferably 0.01 to 0.7 μm, particularly 0.01 to 0.4 μm. Pigments include both "white pigments", which colour the films white, and "colour pigments" which lend the films a coloured or black appearance. Usual pigments are materials such as aluminium oxide, aluminium sulphate, barium sulphate, calcium carbonate, magnesium carbonate, silicates such as aluminium silicate (kaolin clay) and magnesium silicate (talcum), silicon dioxide and titanium dioxide, of which white pigments such as calcium carbonate, silicon dioxide, titanium dioxide and barium sulphate are preferred.

In general, at least 95% by weight of the titanium dioxide particles is rutile and is preferably used with a coating of inorganic oxides and/or of organic compounds having polar or nonpolar groups. Such coatings for TiO2 are known in the prior art.

For the purpose of the present invention, "vacuole-initiating fillers" are understood to be solid particles that are incompatible with the polymer matrix and cause the formation of vacuole-like cavities when the films are stretched, the size, nature and number of vacuoles depending on the size and quantity of the solid particles and the stretching conditions such as stretch ratio and stretch temperature. The vacuoles lower the density and lend the films a characteristic, nacreous, opaque appearance, which is caused by light scattering at the "vacuole/polymer matrix" boundary surfaces. The light scattering on the solid particles themselves generally contributes relatively little to the opacity of the film. As a rule, the vacuole-initiating fillers must have a minimum size of 1 μm in order to create an effective, that is to say opacity inducing quantity of vacuoles. The average particle diameter of the particles is generally 1 to 6 μm, preferably 1.5 to 5 μm. The chemical character of the particles is less important providing incompatibility exists.

Usual vacuole-initiating fillers are inorganic and/or organic materials that are incompatible with propylene, and these include aluminium oxide, aluminium sulphate, barium sulphate, calcium carbonate, magnesium carbonate, silicates such as aluminium silicate (kaolin clay) and magnesium silicate (talcum) and silicon dioxide, of which calcium carbonate and silicon dioxide are preferred. With regard to organic fillers, the polymers that are normally used due to their incompatibility with the polymer of the base layer may be considered, particularly including HDPE, copolymers of cyclic olefins such as norbornene or tetracyclododecene with ethylene or propylene, polyesters, polystyrenes, polyamides, halogenated organic polymers, polyesters such as polybutylene terephthalate being preferred. For the purpose of the present invention, "incompatible materials or incompatible polymers" is understood to mean that the material or polymer in question is present in the film as a separate particle or a separate phase.

The thickness of the inner intermediate layer is generally in a range from 5 to 30 μm, preferably 8 to 25 μm, particularly 12 to 25 μm. The density of the film may vary within a range of 0.7 to 0.9 g/cm$^3$ depending on the thickness, composition and vacuole content of the inner intermediate layer. The vacuoles help to lower the density, whereas the pigments, such as TiO2, tend to increase the density of the film due to their higher specific weight. The density of the film is preferably 0.75 to 0.88 g/cm$^3$.

The inner intermediate layer may also contain the usual additives such as neutralising agents, stabilisers, antistatic agents and/or lubricants in their respective effective quantities as were described in the preceding with reference to the inner cover layer. The percentages by weight cited then refer correspondingly to the weight of the intermediate layer.

The vacuole-free base layer of the film according to the invention contains at least 90 to 100% by weight, preferably 92 to 99% by weight propylene polymers, preferably propylene homopolymers, and 0 to 10% by weight, preferably 1 to 8% by weight pigment, relative to the weight of the base layer in each case.

In general, the propylene polymer of the vacuole-free base layer contains at least 96% by weight, preferably 98 to 100% by weight propylene. If present, the corresponding comonomer content of at least 4% by weight or 0 to 2% by weight then generally consists of ethylene. The percentages by weight are given relative to the propylene polymer in each case.

Isotactic propylene homopolymers having a melting point of 150 to 170° C., preferably from 155 to 165° C., and a melt flow index (measurement in accordance with DIN 53 735 under 21.6N load and at 230° C.) from 1.0 to 10 g/10 min, preferably from 1.5 to 6.5 g/10 min. are preferred. The n-heptane soluble fraction of the polymer is generally 0.5 to 10% by weight, preferably 2 to 5% by weight relative to the starter polymer. The molecular weight distribution of the propylene polymer may vary. The ratio of the weight average Mw to the number average Mn is generally between 1 and 15, preferably between 2 and 10. In a further embodiment, the isotactic polypropylene may be a highly isotactic polypropylene with a chain isotacticity (13C-NMR) greater than 95%, preferably 96-98%. Materials of such kind are known from the related art and are also called HCPP (high crystallinity polypropylene). In certain circumstances, an isotactic polypropylene may be selected that has been produced with the aid of a metallocene catalyst. These metallocene polypropylenes preferably feature a narrow molecular weight distribution (Mw/Mn<2).

The pigments in the base layer contribute significantly to the whiteness and opacity of the film. In general, the pigments described above with reference to the inner intermediate layer may also be used, particularly the white pigments. Thus, embodiments with a TiO2 content of 5 to 10% by weight are particularly preferred in the base layer.

Besides pigments, the base layer may contain the usual additives such as neutralisers, stabilisers, antistatic agents and/or lubricants in the effective quantities thereof as described above with reference to the inner cover layer. The percentages by weight cited then refer correspondingly to the weight of the base layer.

The thickness of the base layer is generally in a range from 10 to 60 μm, preferably from 15 to 50 μm.

The polyolefin film according to the invention has a second, outer cover layer IIIa on the side opposite to the inner cover layer, which demonstrates good adhesion with regard to usual printing inks, adhesives, and coatings and/or paints. To further improve the adhesion of printing inks, adhesives and coatings, it is preferred to carry out a corona, plasma or flame surface treatment on the surface of the outer cover layer.

The outer cover layer IIIa is generally constructed from polymers of olefins having 2 to 10 carbon atoms. The outer cover layer generally contains 95 to 100% by weight polyolefin, preferably 98 to <100% by weight polyolefin, relative to the weight of the outer cover layer in each case.

Examples of suitable olefinic polymers of the outer cover layer are propylene homopolymers, co- or terpolymers II of units of ethylene, propylene and/or butylenes or mixtures of such polymers. These co- or terpolymers II contain no carboxylic acid monomers (or esters thereof). They are polyolefins. Of these, the preferred polymerisates are statistical ethylene-propylene copolymers with an ethylene content from 1 to 10% by weight, preferably 2.5 to 8% by weight, or statistical propylene-butylene-1 copolymers with a butylene content from 2 to 25% by weight, preferably 4 to 20% by weight, or statistical ethylene-propylene-butylene-1 terpolymers with an ethylene content from 1 to 10% by weight and a butylene-1 content from 2 to 20% by weight, or a mixture or blend of ethylene-propylene-butylene-1 terpolymers with propylene-butylene-1 copolymers with an ethylene content of 0.1 to 7% by weight and a propylene content from 50 to 90% by weight, and a butylene-1 content from 10 to 40% by weight. Weight percentages refer to the weight of the respective polymer. The co- and/or terpolymers II described in the preceding that are used in the outer cover layer generally have a melt flow index of 1.5 to 30 g/10 min, preferably of 3 to 15 g/10 min. Their melting point is in the range from 120 to 145° C. The blend of co- and terpolymers II described in the preceding has a melt flow index from 5 to 9 g/10 min and a melting point from 120 to 150° C. All melt flow indices cited in the preceding are measured at 230° C. and under a load of 21.6N (DIN 53 735). If necessary, all of the cover layer polymers described in the preceding may be broken down by the action of peroxide or also thermal oxidation, in which case the degradation factor is generally in a range from 1 to 15, preferably 1 to 8.

Optionally, the additives cited in the preceding, such as antistatic agents, neutralisers, lubricants and/or stabilisers, and if applicable antiblocking agents as well, may be added to the outer cover layer. Weight percentages then refer correspondingly to the weight of the outer cover layer.

Suitable antiblocking agents have already been described in the context of the inner cover layer. These antiblocking agents are also suitable for the outer cover layer. The preferred quantity of antiblocking agents in the outer cover layer is in the range from 0.1 to 2% by weight, preferably 0.1 to 0.8% by weight.

The thickness of the outer cover layer is generally greater than 0.1 μm and is preferably in the range from 0.1 to 5 μm, particularly 0.3 to 2 μm.

In a particularly preferred embodiment, the surface of the outer cover layer undergoes corona, plasma or flame treatment. This treatment improves the adhesion properties of the film surface for subsequent decoration and printing, that is to say to ensure wettability with and adhesion of printing inks and other decoration devices.

The polyolefin film has a second, outer, vacuole-free intermediate layer IIa between the outer cover layer and the vacuole-free, pigment-containing base layer. The polymer for the second, outer, vacuole-free intermediate layer is selected from the propylene polymers described for the base layer. The outer intermediate layer preferably contains 98-100% by weight propylene homopolymer. The outer intermediate layer(s) may contain the usual additives described for the individual layers, such as antistatic agents, neutralisers, lubricants and/or stabilisers. The thickness of this outer intermediate layer is 0.5-10 μm and is preferably in the range from 1.0 to 6 μm, particularly 1 to 4 μm.

The outer intermediate layer contains no vacuole-initiating fillers, and preferably no pigments such as TiO2, and contributes to a high gloss on the outer side of the opaque label. Surprisingly, it was found that the gloss values on the outer side according to the invention could only be achieved by using this outer intermediate layer without filler materials, that is to say without pigments or vacuole-initiating fillers, in conjunction with the vacuole-free base layer. As a result of this structure, the gloss values of the film according to the invention are generally in a range from 50 to 90)(20°), preferably from 55 to 80.

For embodiments in which it is desirable for the label to appear white (high opacity), the outer intermediate layer may optionally include a small quantity of pigment, particularly TiO2, for example in a quantity of 0.5 to 5% by weight, provided the limitations on the gloss values are acceptable in the final application. In these embodiments, the fraction of propylene homopolymer is reduced correspondingly. The gloss values of these embodiments with particularly high whiteness are then in a range from 40 to 80, preferably 45 to 70.

The opacity and whiteness of the film according to the invention varies between the various embodiments. The film may appear translucent, opaque, or white-opaque. Embodiments that do not contain added TiO2 in any of their layers appear translucent to opaque, because the translucence is only reduced by the vacuoles in the inner intermediate layer. Opacity and whiteness are increased by additional TiO2 in the base layer and/or the inner or outer intermediate layers, so these preferred variants are opaque films with a translucence (ASTM-D 1003-77) not greater than 70%, preferably not greater than 50%.

The film according to the invention is preferably a five-layer film constructed with an outer cover layer/outer intermediate layer/base layer/inner intermediate layer/inner cover layer. This layer arrangement may optionally include additional layers, which may be interposed between the respective intermediate layers and the base layer.

The overall thickness of the label film according to the invention may be varied within wide limits and is determined by its intended use. It is preferably 15 to 150 μm thick, particularly 20 to 100 μm, and especially 25 to 90 μm. In this context, the base layer constitutes about 40 to 99%, preferably 50 to 95%, of the overall film thickness.

The invention further relates to a process for producing the polyolefin film according to the invention, according to the coextrusion process that is known on its own merits. In this process, the molten masses corresponding to the individual layers of the film are coextruded simultaneously and together through a flat nozzle, the film obtained in this manner is drawn off on one or more rollers to allow it to solidify, the multilayer film is then stretched (oriented), the stretched film is thermally fixed and if applicable the surface thereof is subjected to plasma, corona or flame surface treatment.

Biaxial stretching (orienting) is performed sequentially or simultaneously. Sequential stretching usually takes place in direct succession, wherein sequential biaxial stretching in which stretching is first performed longitudinally (in the machine direction) and then transversely (perpendicular to the machine direction) is preferred.

In the following, the film production process will be described using the example of flat film extrusion with subsequent sequential stretching.

As is usual in extrusion processes, in a first step the polymers and polymer mixtures of the individual layers are compressed and liquefied in an extruder, wherein any optional additives may have already been included in the polymers and polymer mixtures. The molten masses are then forced simultaneously through a flat nozzle (flat sheet die), and the multilayer film that emerges is drawn off on one or more take-off rollers at a temperature from 10 to 100° C., preferably 10 to 50° C. so that it cools and solidifies.

The film obtained in this way is then stretched longitudinally and transversely to the extrusion direction, which orients the molecule chains. Lengthwise stretching is preferably carried out at a temperature from 70 to 130° C., preferably 80 to 110° C., expediently using two rollers running at different speeds corresponding to the desired stretching ratio, and transverse stretching is carried out preferably at a temperature from 120 to 180° C. with an appropriate tenter. The longitudinal stretching ratios are in the range from 3 to 8, preferably 4 to 6, the transverse stretching ratios are in a range from 5 to 10, preferably 7 to 9.

The film stretching process is followed by thermal fixing (heat treatment), wherein the film is maintained at a temperature of 100 to 160° C. for about 0.1 to 10 s. The foil is then rolled up in the normal way with a takeup mechanism.

After biaxial stretching, one or both of the film surfaces is/are subjected to one of the known corona, plasma or flame treatment methods after biaxial stretching. The treatment intensity is generally in the range from 35 to 50 mN/m, preferably 37 to 45 mN/m.

With corona treatment, the process is advantageously carried out in such manner that the film is fed between two conducting elements serving as electrodes, and a voltage, usually AC voltage (about 5 to 20 kV and 5 to 30 kHz), is applied between the electrodes, the voltage being high enough to cause corona discharges. As a result of these corona discharges the air above the film surface becomes ionised and reacts with the molecules on the film surface, creating polar deposits in the essentially nonpolar polymer matrix.

The surface treatment such as corona treatment may be carried out either immediately during production of the label film or later, for example immediately before the labelling process. In general, surface treatment is preferably performed on the outer side of the label.

According to the invention, the label film is used in deep drawing processes for labelling plastic containers, wherein no other adhesives or gluing agents, coatings or similar auxiliary substances need to be applied to the inner surface in a separate work step after the film has been produced. It is also not necessary to emboss the inner surface.

The containers to be labelled are made from thermoplastic polymer and are formed from panels (called sheets) in the deep drawing method. Depending on the requirements imposed on the container, the thermoplastic polymers used to make the container may be for example high- or low-density polypropylene (PP) or polyethylene (HD-PE, LD-PE or LLD-PE), and in exceptional cases mixtures of such polymers as well. The shape of the containers is not subject to any limitations, provided the receptacles in question can be produced in a thermoforming process.

These particularly include receptacles in the shape of cup and bowls.

In order to apply the label film of the invention to the containers, the label, which is usually been printed beforehand, is cut to shape and size and placed in stacks before the contained is moulded. Labels are removed from the stack and placed in the form singly and in such manner that the outer side of the label, which has generally been preprinted, is in contact with the mould and subsequently forms the visible side of the container. The inside (inner cover layer) of the label faces toward the container. When the container is moulded, that is to say during deep drawing, the inner surface of the label is bonded to the container by the effects of pressure and temperature.

In suitable deep drawing processes, thick films of thermoplastic polymers are subjected to plastic moulding at elevated temperatures and by the application of pneumatic forces, or mechanical forces from moulding tools. Plastic moulding with pneumatic forces may be carried out by creating a partial vacuum (deep drawing) or by applying overpressure, which is to say compressed air. Processes of this kind are known in the prior art and are referred to as "thermoforming" in English. The processes and the design thereof are described individually for example in Rosato's Plastics Encyclopedia and Dictionary, pages 755 to 766, which descriptions are herewith expressly included by reference.

Plastic forming with the effects of pneumatic forces is carried out for example using a partial vacuum in which the film to be deep drawn has usually been preformed with a top punch. The label film is placed in the mould before the actual deep drawing process and the deep drawn film is placed over it to create an airtight seal for the moulded article. Depending on which is more suitable, a partial or complete vacuum is created around the moulded article. The pressure differential creates a suction effect on the deep drawing film. A heating element is applied to the film surface and heats the film until it deforms towards the moulded article. In this process, the temperature and underpressure conditions are selected such that the film conforms flush against the moulded article and the inserted label, and thus bonds with the label. When the pressure differential has been removed and after a cooling period, the labelled, deep drawn container may be removed.

The following measuring methods were used to characterize the raw materials and films:

Melt Flow Index

The melt flow index of the propylene polymers was measured in accordance with DIN 53 735 under a load of 2.16 kg and at 230° C., and at 190° C. with a load of 2.16 kg for polyethylenes.

Melting Points

DSC measurement, melt curve maxima, heating rate 20 K/min.

Density

Density is determined in accordance with DIN 53 479, method A.

Determination of Sealing Initiation Temperature (SIT)

Two strips of film are cut and placed one on top of the other on each of the cover layers to be tested. Hot sealed samples (sealed joint 20 mm×100 mm) are produced with the HSG/ETK sealing device from company Brugger by sealing the superposed strips at different temperatures using two heated sealing jaws under a sealing pressure of 10 N/cm2 and for a sealing duration of 0.5 s. Test strips of 15 mm width are cut from the sealed samples. The T peel strength of the sealed joint, that is to say the force required to separate the test strips, is determined with the aid of a tensile testing machine at a drawing speed of 200 mm/min wherein the plane of the sealed joint forms a right angle with the direction of traction. The seal initiation temperature is the temperature at which a joint peel strength of at least 1.0N/15 mm is achieved.

To determine sealing initiation temperature II of the inner cover layer, one inner cover layer is sealed with another inner cover layer, and the procedure is otherwise carried out as above.

For the purposes of the present invention, sealing initiation temperature I of co- and terpolymers I is understood to be the sealing initiation temperature that is present on a biaxially stretched film having a polypropylene base layer with an approximately 1.5 μm thick cover layer consisting of 100% by weight of the respective co- or terpolymer or the mixture thereof. In order to determine this value, the film must not have undergone surface treatment, since this may influence the value of sealing initiation temperature I. The cover layer should also not contain of any usual additives such as antiblocking agents or lubricants, since these too may influence sealing initiation temperature I. The determination should be carried out with a cover layer having a minimum thickness generally between 1 and 2 μm, taking into account usual thickness fluctuations. Sealing initiation temperature I itself is determined on this reference film as described in detail above.

Roughness Measurement

To serve as the roughness measurement of the inside surfaces of the films, roughness values Rz of the films were measured in the profile method using a type S8P Perthometer manufactured by Feinprüf Perthen GmbH, Göttingen on the basis of DIN 4762, DIN ISO 4287, DIN-ISO 4288, Part 1 and DIN 4777, also DIN 4772 and 4774. The measuring head, a single skid scanning system as defined in DIN 4772, was equipped with a scanning tip having a radius of 5 μm and a flank angle of 90° with a contact pressure of 0.8 to 1.12 mN and a skid with a radius of 25 mm in the sliding direction. The vertical measurement range was set to 62.5 μm, the scan section to 5.6 mm, and the RC filter cut-off in accordance with DIN 4768/1 was set to 0.25 mm.

Gloss

Gloss was determined in accordance with DIN 67 530. The reflection factor was measured as an optical characteristic of the surface of a film. Based on the standards ASTM-D 523-78 and ISO 2813, the angle of incidence was set to 20°. A light beam falls on the flat test surface at the set angle of incidence and is reflected or scattered by the surface. The rays of light that then fall on the photoelectric receiver are displayed as a proportional electrical variable. The measured value is dimensionless and must be indicated together with the angle of incidence.

Opacity and Whiteness

The opacity and whiteness are determined with the aid of the "ELREPHO" electric remission photometer produced by Zeiss, Oberkochen (DE), standard illuminant C, 2° observer. Opacity is determined in accordance with DIN 53 146. Whiteness is defined as WG=RY+3RZ−3RX.

WG=Whiteness RY, RZ, RX=corresponding reflection factors with use of Y, Z and X colorimetric filter. A compact of barium sulphate (DIN 5033, Part 9) is used as the white standard. A thorough description is included for example in Hansl Loos "Farbmessung", Verlag Beruf and Schule, Itzehoe (1989).

Density

Density is determined in accordance with DIN 53 479, Method A.

The invention will now be explained using the following examples.

EXAMPLE 1

After the co-extrusion process, a five-layer prefilm was co-extruded through a flat sheet die. This prefilm was drawn off and solidified on a cooling roller, then oriented longitudinally and transversely, and finally heat-set. The surface of the outer cover layer was pretreated in a corona process to increase the surface tension. The five-layer film had a layer organisation consisting of outer cover layer/outer intermediate layer/base layer/inner intermediate layer/inner cover layer. The composition of the individual layers of the film was as follows:

| Outer cover layer (1.0 µm): | |
|---|---|
| 100% by weight | Ethylene-propylene copolymerisate having an ethylene fraction of 4% by weight (relative to the copolymer) and a melting point of 135° C.; and a melt flow index of 7.3 g/10 min at 230° C. under load of 2.16 kg (DIN 53 735) |

| Outer intermediate layer (4 µm): | |
|---|---|
| 100% by weight | Propylene homopolymerisate (PP) having an n-heptane soluble fraction of 4.5% by weight (relative to 100% PP), a melting point of 165° C.; a melt flow index of 3.2 g/10 min at 230° C. under load of 2.16 kg (DIN 53 735) |

| Base layer (33 µm) | |
|---|---|
| 91.6% by weight | Propylene homopolymerisate (PP) having an n-heptane soluble fraction of 4.5% by weight (relative to 100% PP), a melting point of 165° C.; a melt flow index of 3.2 g/10 min at 230° C. under load of 2.16 kg (DIN 53 735), and |
| 8.0% by weight | TiO2 with average particle diameter of 0.1 to 0.3 µm |
| 0.2% by weight | Tertiary aliphatic amine as antistatic agent (Armostat 300) |
| 0.2% by weight | Erucic acid amide as lubricant (ESA) |

| Inner intermediate layer (18 µm) | |
|---|---|
| 85.0% by weight | having an n-heptane soluble fraction of 4.5% by weight (relative to 100% PP), a melting point of 165° C.; a melt flow index of 3.2 g/10 min at 230° C. under load of 2.16 kg (DIN 53 735) |
| 15.0% by weight | Calcium carbonate with average particle diameter of 3.5 µm |

| Inner cover layer (1.0 µm): | |
|---|---|
| 100% by weight | Propylene-butylene copolymerisate having a butylene fraction of 30 Mol % (relative to the copolymer) and a melting point of 130° C.; and a melt flow index of 5.0 g/10 min at 230° C. under load of 2.16 kg (DIN 53 735). |

All layers of the film also contain stabilising and neutralising agents in the usual quantities.

In detail, the following conditions and temperatures were selected for production of the film:

| | |
|---|---|
| Extrusion: | Extrusion temperature approximately 250° C. |
| Cooling roller: | Temperature 25° C., |
| Longitudinal stretching: | T = 120° C. |
| Longitudinal stretching by | Factor 5 |
| Transverse stretching: | T = 150° C. |
| Transverse stretching by | Factor 8 |
| Heat-setting: | T = 133° C. |

The surface of the outer cover layer of the film underwent corona surface treatment. The foil had a density of 0.85 g/cm$^3$, and a thickness of 57 µm.

EXAMPLE 2

A film was produced as described in example 1. In contrast to example 1, the inner cover layer contained 70% by weight propylene butylene copolymerisate of example 1 and 30% by weight polyethylene (MDPE) with a density of 0.931 g/cm$^3$ and a melt flow index (190° C. and 50 N) of 0.8 g/10 min. The rest of the composition and process conditions were unchanged during production of the film.

EXAMPLE 3

A film was produced as described in example 2. In contrast to example 2, the inner cover layer contained 70% by weight ethylene-propylene copolymerisate having an ethylene fraction of 4% by weight (relative to the copolymer) and a melting point of 135° C.; and a melt flow index of 7.3 g/10 min at 230° C. under 2.16 kg load (DIN 53 735) and 30% by weight of the same polyethylene. The rest of the composition and process conditions were unchanged during production of the film.

COMPARISON EXAMPLE 1

A film was produced as described in example 1. In contrast to example 1, the inner intermediate layer contained no calcium carbonate and had a thickness of 7 µm. The propylene homopolymer fraction was increased correspondingly. The rest of the composition and process conditions were unchanged during production of the film.

COMPARISON EXAMPLE 2

A film was produced as described in example 2. In contrast to example 2, the inner intermediate layer contained no calcium carbonate and had a thickness of 7 μm. The propylene homopolymer fraction was increased correspondingly. The rest of the composition and process conditions were unchanged during production of the film.

COMPARISON EXAMPLE 3

A film was produced as described in example 3. In contrast to example 3, the inner intermediate layer contained no calcium carbonate and had a thickness of 7 μm. The propylene homopolymer fraction was increased correspondingly. The rest of the composition and process conditions were unchanged during production of the film.

COMPARISON EXAMPLE 4

A film was produced as described in example 1. The composition of the individual layers was modified as follows:

| No. | SIT II of inner cover layer | Roughness Rmax/Rz of inner cover layer | Adhesion to container | Gloss of labelled container | Blistering |
|---|---|---|---|---|---|
| Ex. 1 | 70° C. | 5.45/4.12 μm | Very good | Very good | None |
| Ex. 2 | 100° C. | 7.45/6.15 μm | Very good | Very good | None |
| Ex. 3 | 118° C. | 9.66/7.47 μm | Good | Very good | None |
| Comp. ex 1 | 78° C. | 0.85/0.66 μm | Very good | Good | Heavy |
| Comp. ex 2 | 112° C. | 5.57/4.55 μm | Minimal | — | — |
| Comp. ex 3 | 120° C. | 6.31/4.82 μm | None | — | — |
| Comp. ex 4 | 105° C. | 4.23/3.28 μm | Very good | Orange peel | None |
| Comp. ex 5 | 125° C. | 4.50/3.32 μm | Good | Orange peel | Light |

Outer cover layer (1.0 μm):

| 100% by weight | Ethylene-propylene copolymerisate having an ethylene fraction of 4% by weight (relative to the copolymer) and a melting point of 135° C.; and a melt flow index of 7.3 g/10 min at 230° C. under load of 2.16 kg (DIN 53 735) |
|---|---|

Outer intermediate layer (4 μm):

| 94% by weight | Propylene homopolymerisate (PP) having an n-heptane soluble fraction of 4.5% by weight (relative to 100% PP), a melting point of 165° C.; and a melt flow index of 3.2 g/10 min at 230° C. under load of 2.16 kg (DIN 53 735), and |
|---|---|
| 6% by weight | Titanium dioxide, average particle diameter from 0.1 to 0.3 |

Base layer

| 89.6% by weight | Propylene homopolymerisate (PP) having an n-heptane soluble fraction of 4.5% by weight (relative to 100% PP) and a melting point of 165° C.; and a melt flow index of 3.2 g/10 min at 230° C. under load of 2.16 kg (DIN 53 735), and |
|---|---|
| 14% by weight | Calcium carbonate with average particle diameter of 3.5 μm |
| 0.2% by weight | Tertiary aliphatic amine as antistatic agent (Armostat 300) |
| 0.2% by weight | Erucic acid amide as lubricant (ESA) |

Inner intermediate layer (6 μm)

| 100% by weight | Propylene homopolymerisate (PP) having an n-heptane soluble fraction of 4.5% by weight (relative to 100% PP) and a melting point of 165° C.; and a melt flow index of 3.2 g/10 min at 230° C. under load of 2.16 kg (DIN 53 735), |
|---|---|

Inner cover layer (2.5 μm):

| 70% by weight | Propylene-butylene copolymerisate having a butylene fraction of 30 Mol % (relative to the copolymer) and a melting point of 130° C.; and a melt flow index of 5.0 g/10 min at 230° C. under load of 2.16 kg (DIN 53 735) and |
|---|---|
| 30% by weight | Polyethylene (HDPE) having a density of 0.931 g/cm3 and melt flow index (190° C. and 50N) of 0.8 g/10 min. |

COMPARISON EXAMPLE 5

A film was produced as described in comparison example 4. In contrast to comparison example 4 the inner cover layer contained 70% by weight ethylene-propylene copolymerisate with an ethylene fraction of 4% by weight (relative to the copolymer) and a melting point of 135° C.; and a melt flow index of 7.3 g/10 min at 230° C. under 2.16 kg load (DIN 53 735) and 30% by weight polyethylene (HDPE) having a density of 0.931 g/cm³ and a melt flow index of (190° C. and 50 N) of 0.8 g/10 min.

USE ACCORDING TO THE INVENTION

The films according to the examples and comparison examples were used as label films in the deep drawing process of an oval cup. For this, the labels were punched out in the appropriate shape, the cutouts were stacked and loaded into a magazine on the deep drawing system. The deep drawing system was equipped with a top punch as a moulding aid. The labels were removed from the magazine by suction and wrapped around a template core. Preshaped in this way, the label was placed in the mould via the template core and held in place by vacuum suction. The outer, printed cover layer was in contact with the mould. The inner cover layer was facing towards the container to be moulded.

A 600 μm thick PP deep drawing film was heated up to its plastic deformability range (>165° C.) using an IR radiator or contact heater. The deep drawing film was moulded to a cup by lowering the top punch and applying a vacuum to the underside and compressed air to the upper side, bonding with the inserted label.

The labelled containers were inspected with regard to adhesion and appearance. It was revealed that the films of the comparison examples exhibited significant blistering between the film and the container wall, or that adequate adhesion to the container wall was not achieved, or that the appearance of the labelled container was severely impaired by orange peel skin.

The films of examples 1-3 exhibited homogeneous appearance of the label surface without blister formation or other visible flaws, and good adhesion of the label to the container surface, and a very good gloss impression of the labelled container.

The invention claimed is:

1. A label for deep drawing which comprises a multilayer, biaxially oriented polyolefin film comprising at least five layers, comprising:
    a polypropylene base layer (I) free from vacuoles;
    one inner cover layer (IIIb) having a sealing initiation temperature of <130° C. such that the inner cover layer is sealable;
    one outer cover layer (IIIa) to which printing may be applied; one inner intermediate layer (IIb) comprising propylene polymer and vacuoles and having a thickness in a range from 12 to about 18 μm; and
    one outer intermediate layer (IIa) free from vacuoles and comprising at least 95% by weight propylene polymer, which polymer has a propylene content of 98 to 100% by weight relative to the propylene polymer;
    wherein the inner cover layer is applied to a surface of the inner intermediate layer and the outer intermediate layer contains no $TiO_2$.

2. The label as claimed in claim 1, wherein the inner cover layer IIIb contains 30 to <100% by weight of a propylene copolymer and/or a propylene terpolymer.

3. The label as claimed in claim 1, wherein the polypropylene base layer contains $TiO_2$.

4. The label as claimed in claim 1, wherein the inner cover layer IIIb contains >95% by weight copolymers and/or terpolymers I of propylene, ethylene and/or butylene units and the inner cover layer has a sealing initiation temperature II from 70 to 115° C.

5. The label as claimed in claim 4, wherein a surface of the inner cover layer IIIb has a roughness Rz of 3 to 8 μm with a cut-off of 0.25 mm.

6. The label as claimed in claim 1, wherein the inner cover layer IIIb contains 40-95% by weight copolymers and/or terpolymers I of propylene, ethylene and/or butylene units and 5 to 60% by weight of an incompatible polymer, wherein the weight percentage figures are relative to the weight of the inner cover layer in each case and the inner cover layer has a sealing initiation temperature II from >110 to <130° C.

7. The label as claimed in claim 6, wherein a surface of the inner cover layer IIIb has a roughness Rz of 7 to 12 μm with a cut-off of 0.25 mm.

8. The label as claimed in claim 1, wherein the inner cover layer IIIb contains 40-95% by weight copolymers and/or terpolymers I of propylene, ethylene and/or butylene units and 5 to 60% by weight of an incompatible polymer, wherein the weight percentage figures are relative to the weight of the inner cover layer in each case and the inner cover layer has a sealing initiation temperature II from 70 to 110° C.

9. The label as claimed in claim 8, wherein a surface of the inner cover layer IIIb has a roughness Rz of 6 to 10 μm with a cut-off of 0.25 mm.

10. The label as claimed in claim 6, wherein the incompatible polymer is a polyethylene.

11. The label as claimed in claim 6, wherein the incompatible polymer is an HDPE or an MDPE.

12. The label as claimed in claim 4, wherein the copolymer I is a propylene-butylene copolymer having a butylene content from 10 to 40% by weight.

13. The label as claimed in claim 1, wherein the inner cover layer IIIb has a thickness from 0.5 to 3 μm.

14. The label as claimed in claim 1, wherein the density of the multilayer, biaxially oriented polyolefin film is in a range from 0.7 to 0.9 $g/cm^3$.

15. The label as claimed in claim 1, wherein the outer intermediate layer contains 0.5 to 5% by weight $TiO_2$.

16. The label as claimed in claim 2, wherein the inner cover layer IIIb contains >95% by weight copolymers and/or terpolymers 1 of propylene, ethylene and/or butylene units and the inner cover layer has a sealing initiation temperature I from 75 to 110° C. and said inner cover layer has a thickness of 1 to 3 μm and the thickness of the outer intermediate layer is from 1 to 4 μm.

17. The label as claimed in claim 1, wherein the inner intermediate layer comprises solid particles that are a vacuole-initiating filler.

18. The label as claimed in claim 1, wherein the inner intermediate layer comprises 70 to 98% by weight of propylene polymer and solid particles that are a vacuole-initiating filler, said label has an overall thickness of 15 to 150 μm,
    the base layer constitutes 40 to 99% of the overall thickness and
    the average particle diameter of the solid particles is 1 to 6 μm.

19. The label as claimed in claim 1, wherein the inner intermediate layer comprises 80 to 92% by weight of propylene polymer and solid particles that are a vacuole-initiating filler, said label has an overall thickness of 25 to 90 μm,
    the base layer constitutes 50 to 95% of the overall thickness and
    the average particle diameter of the solid particles is generally 1.5 to 5 μm.

20. A process for producing a labelled container by deep drawing comprising:
    placing a cut-to-size label in a mould wherein the cut-to-size label comprises:
    a polypropylene base layer (I) free from vacuoles;
    one outer intermediate layer (IIa) free from vacuoles and comprising at least 95% by weight propylene polymer having a propylene content of 98 to 100% by weight relative to the propylene polymer;
    one inner intermediate layer (IIb) comprising propylene polymer and vacuoles and having a thickness in a range from 12 to about 18 μm;
    one inner cover layer (IIIb) applied to a surface of the inner intermediate layer having a sealing initiation temperature of <130° C. such that the inner cover layer is sealable; and
    one outer cover layer (IIIa);

providing a deep drawing film;

heating the deep drawing film by heater elements to a temperature at which the polymer is thermoplastically deformable; and drawing the deep drawing film into a shape pneumatically or with the aid of a moulding tool, so that the deep drawing film conforms to the shape of the mould and a container is moulded and the inserted label is applied at the same time.

21. The process as recited in claim 20, wherein before application of the label to the labelled container an outer surface of said label has a gloss in the range from 50 to 90 at an angle of incidence of 20°, and after application of said label to the labelled container the gloss on the outer surface of said label retains 100 to 90% of its original gloss value.

* * * * *